United States Patent Office 3,535,796
Patented Oct. 27, 1970

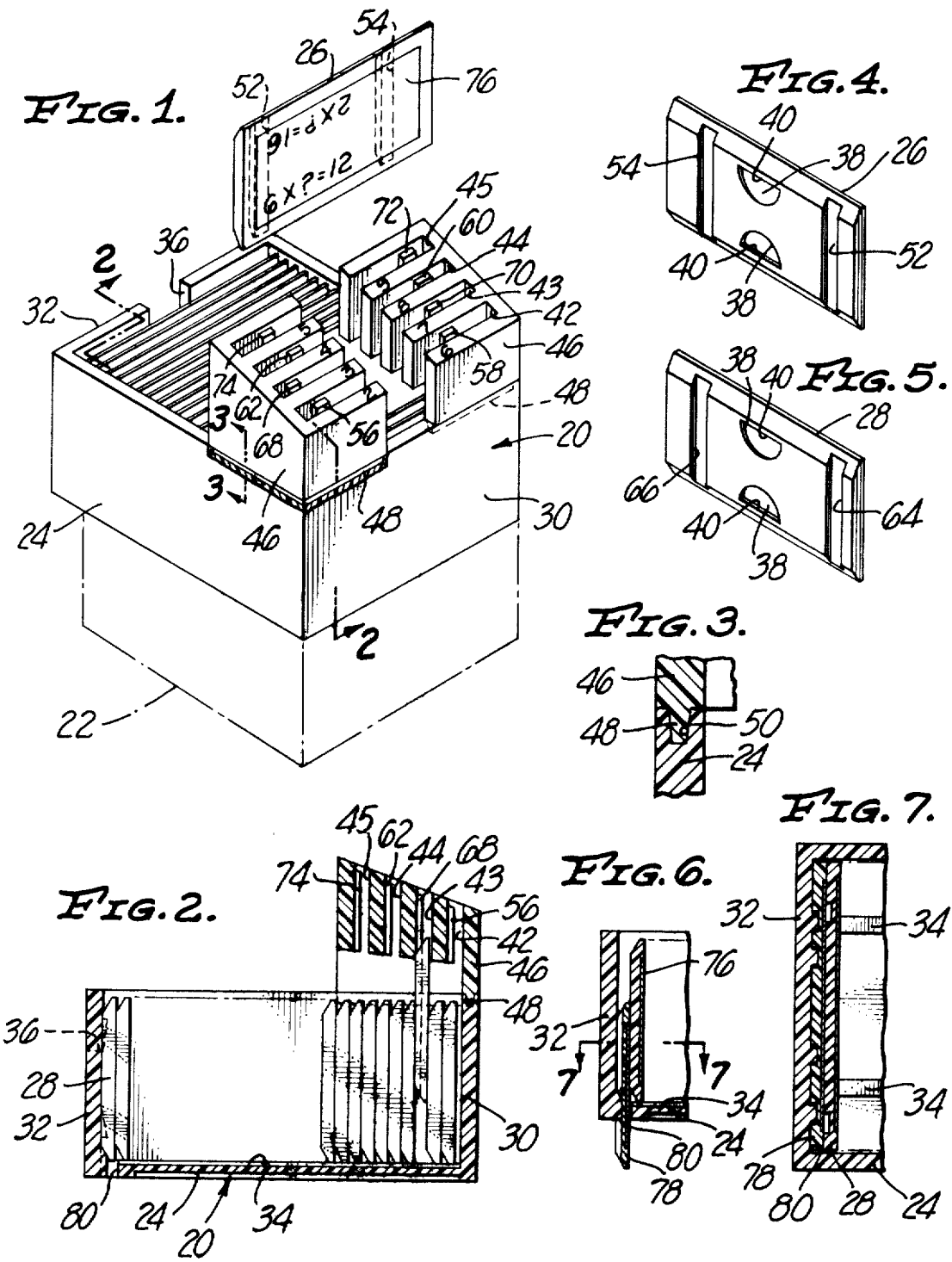

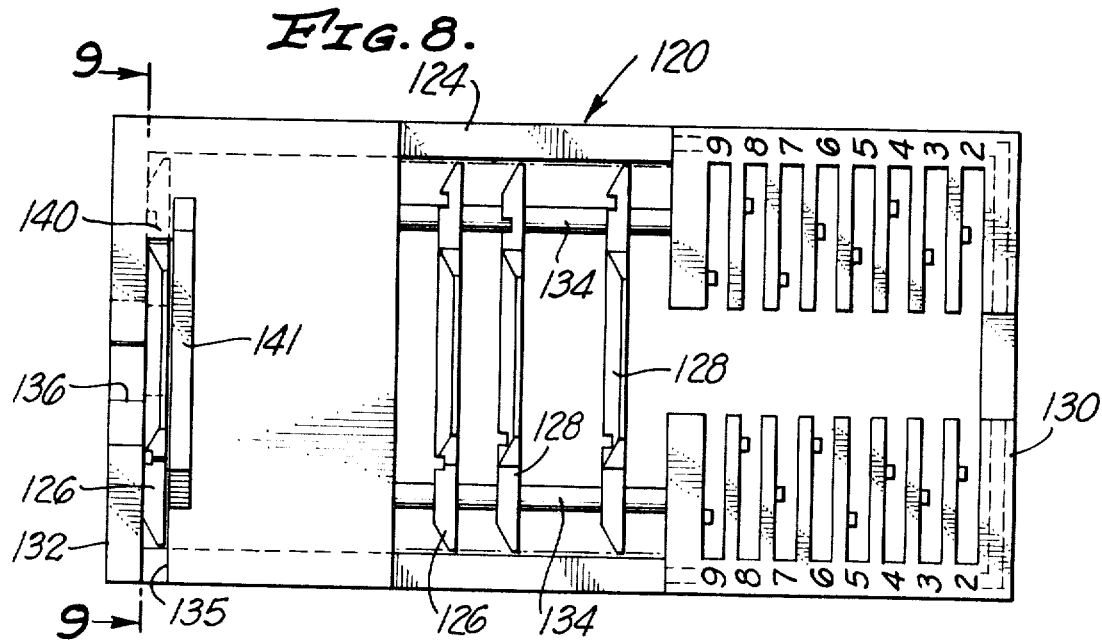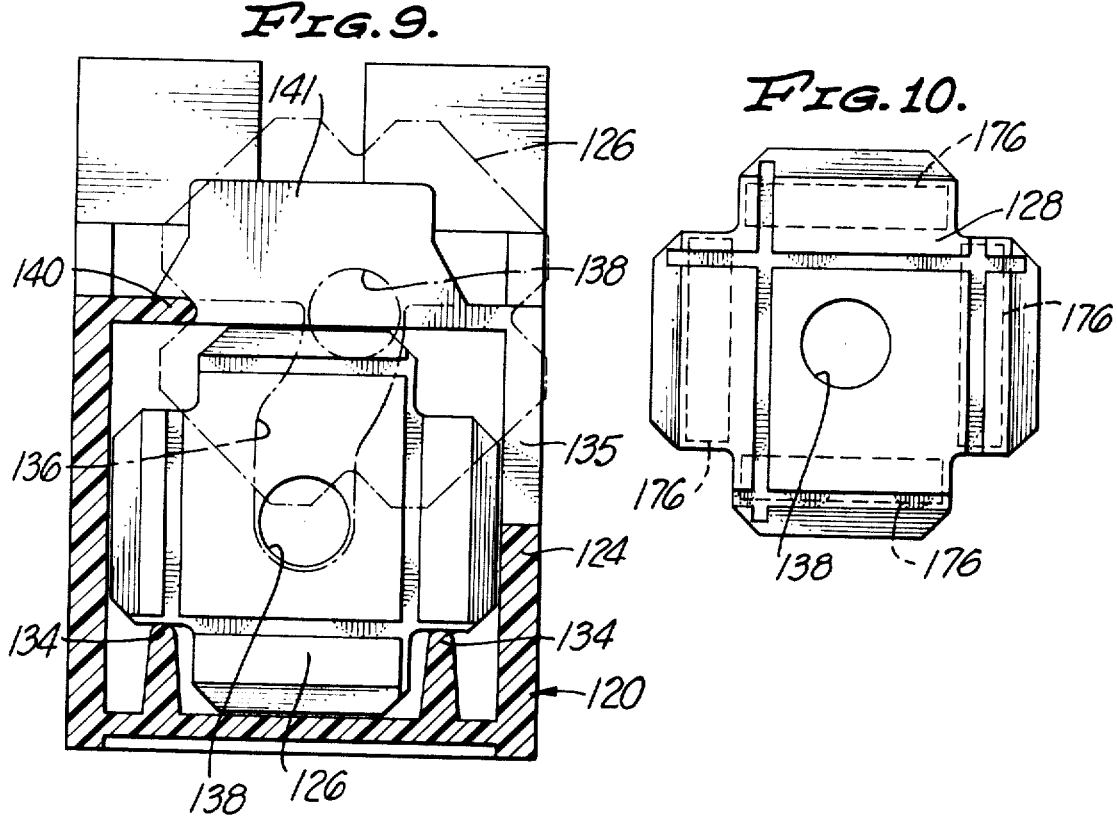

3,535,796
QUESTION AND ANSWER DEVICE
Ralph L. Dean, 330 Raymondale Drive,
South Pasadena, Calif. 91030
Filed Apr. 22, 1968, Ser. No. 722,961
Int. Cl. G09b 3/06
U.S. Cl. 35—9
9 Claims

ABSTRACT OF THE DISCLOSURE

A question and answer device comprising a magazine containing a series of question plates which may be removed one at a time. Each question plate is reinsertable into the magazine through a conforming one of a series of answer slots above the magazine to indicate that the correct answer has been selected. Some of the answer slots are located between the ends of the magazine so that question plates reinserted into the magazine therethrough are inserted between other question plates in the magazine. This continually changes the order of the question plates in the magazine so that there is no constant sequence of questions which the user can memorize, instead of determining the answer to each individual question.

BACKGROUND OF INVENTION

The present invention relates in general to a question and answer device which may be used for educating or testing purposes, or the like. For example, the device may be used by a student for self-teaching and self-drilling in any one of a variety of subjects, such as arithmetic, history, English, or the like, or which may be used to test the student's knowledge of the foregoing or other subjects. Basically, the device presents multiple choice questions and indicates whether the answers selected are correct or incorrect, it being understood that true or false questions are encompassed by the term multiple choice questions.

Question and answer devices of the foregoing general character preferably avoid presenting questions in a fixed sequence, a random presentation being desirable. The reason for this is that the student is tempted merely to memorize the sequence if it is fixed, instead of determining the answer to each question individually. Obviously, such sequence memorizing is undesirable since it defeats the basic purposes of teaching and/or testing.

Many conventional devices of the foregoing general nature are relatively complex, requiring numerous moving parts. Consequently, they are rather expensive and thus beyond the financial reach of many students and/or schools.

SUMMARY AND OBJECTS OF INVENTION

In the light of the foregoing background discussion, a primary object of the invention is to provide a random-sequence question and answer device which is extremely simple and which requires no moving parts in the usual sense. Consequently, the device is inexpensive to manufacture and thus can be sold at a comparatively low price.

A basic object of the invention is to provide a question and answer device comprising as its essential components a magazine, answer passages communicating with the magazine and respectively having different cross-sectional configurations, and question elements removable one at a time from the magazine and each having a cross-sectional configuration conforming to that of the answer passage representing the correct answer. With this construction, if the user selects an answer passage which does not correspond to the correct answer to the question presented by a particular question element, the answer passage will not accept the question element. However, if the correct answer passage is selected, the question element will pass through the answer passage and will be reinserted in the magazine, which is an important feature of the invention.

The question elements may take various forms within the scope of the invention. For example, in a device for use by very small children, the question elements may even be pegs, or other objects, having different cross-sectional configurations, such as circular, square, triangular, and the like. In such a case, the answer passages are correspondingly shaped. In the particular embodiments elected for consideration herein, however, the question elements are plates, or the like, carrying printed questions, or the like, which are answered by reinserting the question elements into the magazine through answer passages having respectively corresponding cross-sectional configurations.

Question elements of the foregoing nature may carry true or false questions, in which case only two answer passages are required. More generally, the questions on any given number of question elements may have one common answer, in which case the number of common answers involved in the entire series of question elements would require a corresponding number of answer passages.

An important object of the invention, in connection with presenting questions in a random sequence, is to locate at least one of the answer passages between the ends of the magazine so that question elements inserted into the magazine through this answer passage may be inserted between other question elements in the magazine, instead of being inserted into the magazine at one end of the series of question elements therein. With this construction, the order of sequence of the question elements in the magazine is changed every time a question element is reinserted into the magazine through the answer passage or passages located between the ends of the magazine, which is an important feature of the invention.

Another object is to provide a device wherein the question elements may be removed from the magazine one at a time through an access passage, which may be formed simply by providing the magazine with an open top. The access passage is spaced longitudinally of the magazine from the answer passages, the access passage preferably being located at one end of the magazine and the answer passages adjacent the opposite end thereof. The answer passages are preferably located above the magazine and communicate therewith at their lower ends so that gravity assists in reinserting the question elements into the magazine through the conforming answer passages.

Another object of the invention is to provide a magazine which is simply a box-like structure capable of being stacked with other, identical magazines containing different sets of question elements. In this connection, an object is to provide a magazine on which a structure forming the answer passages is detachably mounted so that it can be transferred from one magazine to another when a different set of question elements is desired. This minimizes the space required to store a number of magazines.

Still another object is to provide a dummy question element in the magazine to mark the end of the series of question elements, the magazine being provided in the bottom thereof and adjacent the access passage with a discharge passage conforming in cross-sectional configuration to the dummy question element, whereby the dummy question element drops from the magazine through the discharge passage when the end of the series of question elements is reached, to indicate that fact.

Another important object of the invention is to provide a question and answer device wherein the question elements comprise question plates and wherein each of the question plates and the conforming one of the answer passages are provided with mating grooves and lands permitting insertion of each question plate into the magazine through the answer passage conforming thereto.

Yet another object is to provide a device wherein each question element has two different cross-sectional configurations respectively conforming to two different answer passages when inserted into such answer passages with orientations angularly spaced apart by 180°. In other words, each question element will pass only through a different answer passage when it is inverted.

A further object is to provide means for automatically rotating each question element into a new operating position as it is withdrawn from the magazine.

More particularly, an additional object is to provide a device wherein each question element has four different cross-sectional configurations respectively conforming to those of four different answer passages when inserted into such answer passages with orientations angularly spaced apart by 90°. This permits each question element to carry four questions, instead of one or two. A related object is to provide cooperating means on the magazine and on the question elements for automatically rotating each question element through an angle of 90° as it is removed from the magazine through the access passage. This automatically changes the question presented by a particular question element from the question presented thereby when it was used previously.

The foregoing objects, advantages, features and results of the present invention, together with various other objects, advantages, features and results thereof which will be evident to those skilled in the art in the light of this disclosure, may be achieved with the exemplary embodiments of the invention illustrated in the accompanying drawings and described in detail hereinafter.

DESCRIPTION OF DRAWINGS

In the drawings:

FIG. 1 is an isometric view of a question and answer device which embodies the invention;

FIG. 2 is a longitudinal sectional view through the device which is taken as indicated by the arrowed line 2—2 of FIG. 1;

FIG. 3 is an enlarged, fragmentary sectional view taken as indicated by the arrowed line 3—3 of FIG. 1;

FIGS. 4 and 5 are rear isometric views of question elements for use with the device;

FIG. 6 is a view duplicating the left end of FIG. 2 and illustrating the downward passage of a dummy question element through a discharge passage in a magazine of the device;

FIG. 7 is a sectional view taken as indicated by the arrowed line 7—7 of FIG. 6;

FIG. 8 is a plan view of another embodiment of the invention;

FIG. 9 is a transverse sectional view taken as indicated by the arrowed line 9—9 of FIG. 8; and FIG. 10 is an elevational view of a question element for use with the device of FIGS. 8 and 9.

DETAILED DESCRIPTION OF EXEMPLARY EMBODIMENTS OF INVENTION

Referring initially to FIG. 1 of the drawings, one embodiment of the question and answer device of the invention is designated generally therein by the numeral 20 and is shown as seated on a stand 22 of any suitable construction. For a reason to be discussed hereinafter, the stand 22 is somewhat shorter than the question and answer device 20 in the fore-and-aft direction so as to provide the device 20 with a rear overhang.

The question and answer device 20 includes a magazine 24 which is seated on the stand 22 with the aforementioned rear overhang. Preferably, the magazine 24 is a simple, rectangular, open topped box capable of being stacked in a minimum of space along with other, identical magazines, not shown.

The magazine 24 contains a series of question elements 26 and 28 which are preferably rectangular plates having beveled horizontal edges, the vertical edges of these plates being shown as beveled also. The series of question plates 26 and 28 loosely fills the magazine 24 when all of the question plates are in the magazine. Thus, the question plates 26 and 28 remain in generally upright positions even when one of them is removed from the magazine. The fact that the series of question plates 26 and 28 loosely fills the magazine permits easy removal and reinsertion of the question plates 26 and 28 one at a time.

The question plates 26 and 28 are slidable longitudinally of the magazine 24 from the front end 30 of the magazine to the rear end 32 thereof, this occurring during the use of the question and answer device 20, as will be discussed hereinafter. To facilitate such rearward sliding movement of the question plates 26 and 28, the lower edges thereof slide on laterally spaced rails 34 which extend from the front end 30 of the magazine 24 substantially to the rear end 32 thereof, and which may be formed integrally with the bottom of the magazine.

The open top of the magazine 24 provides an access passage through which the answer plates 26 and 28 may be removed one at a time as they arrive at the rear end 32 of the magazine. The rear end 32 of the magazine 24 is provided in its upper edge with a central notch 36 through which the user's index finger may be inserted into the uppermost of two vertically spaced, oppositely oriented recesses 38 in the rear side of each question plate 26 and 28. Each of the recesses 38 provides a shoulder 40 which faces away from the adjacent horizontal edge of the corresponding question plate 26 or 28. The shoulder 40 of the uppermost recess 38 is engageable by the end of the user's finger to lift the rearmost question plate 26 or 28 from the magazine as the user's finger moves upwardly through and out of the notch 36. Thus, it will be evident that the construction described permits removal of the question plates 26 and 28 from the magazine 24 one at a time, only the rearmost question plate in the series being accessible for removal since the upper edges of the question plates are below the top of the magazine.

The question and answer device 20 is provided, adjacent the front end of and above the magazine 24, with answer passages which are shown as four in number in the particular embodiment under consideration and which are identified by the numerals 42, 43, 44 and 45, respectively. In the particular construction illustrated, since the question elements 26 and 28 are rectangular plates, the answer passages 42, 43, 44 and 45 are complementary slots. These answer slots extend laterally upwardly from the magazine 24 and communicate therewith at their lower ends. The answer slots 42, 43, 44 and 45 are spaced apart longitudinally of the magazine 24 with the answer slot 42 located at the front end 30 of the magazine, adjacent the front end wall thereof, as best shown in FIG. 2 of the drawings. The remaining answer slots 43, 44 and 45 are located rearwardly of the front end 30 of the magazine 24.

As will be discussed in more detail hereinafter, the question plates 26 and 28 are selectively insertable through the answer slots 42, 43, 44 and 45 into the magazine 24. The particular question plate which is insertable into the front answer slot 42 is inserted into the magazine 24 at the front end of the series of question plates in the magazine, i.e., is inserted between the front end 30 of the magazine and the front question plate already in the magazine. Thus, a question plate inserted through the front answer slot 42 displaces all of the question plates in the magazine 24 rearwardly by the thickness of one question plate. However, any question plates which are insertable through the answer slots 43, 44 and 45 are inserted into the magazine 24 between question plates already in the magazine, and thus displace rearwardly only those question plates located behind the inserted plates. As will be apparent, this has the effect of randomly changing the sequence of the question plates in the magazine 24. Thus, question plates inserted through the front answer slot 42 displace the entire series of question plates rearwardly in the magazine 24, while question plates inserted through the answer slots 43, 44 and 45 displace only parts of the series and randomly change the question-plate sequence in the magazine, which are important features of the invention.

The answer slots 42, 43, 44 and 45 are formed by opposed walls on two laterally spaced slot-forming members 46 removably mounted on the top of the magazine 24 adjacent the front end 30 thereof. A shown in FIG. 3, the two slot-forming members 46 may be provided with depending L-shaped tongues 48 inserted into complementary L-shaped grooves 50 in the top edges of the front and side walls of the magazine 24. With this construction, the slot-forming members 46 can be mounted on and removed from the magazine 24 readily. When the slot-forming members 46 are removed, the magazine 24 can be stored in a minimum of space in a stack of identical magazines.

As previously indicated, the two slot-forming members 46 are spaced apart laterally of the magazine 24. This provides between the slot-forming members 46 a gap which will accommodate the user's index finger to facilitate downward insertion of the question plates 26 and 28 through the answer slots 42, 43, 44 and 45 into the magazine 24. As best shown in FIG. 2 of the drawings, the opposed slot-forming walls of the members 46, except for the front walls thereof, are spaced upwardly above the top of the magazine 24. This minimizes any tendency of the question plates 26 and 28 to bind in the answer slots 42, 43, 44 and 45 as they are inserted downwardly therethrough and into the magazine 24 adjacent or between the other question plates therein.

Turning now to a consideration of the relationships between the question plates 26 and 28 and the answer slots 42, 43, 44 and 45, the answer slots respectively have different cross-sectional configurations and the question plates respectively have complementary or conforming cross-sectional configurations. It will be noted that there are four different answer slots 42, 43, 44 and 45 and only two different question plates 26 and 28. However, each of the question plates 26 and 28 has, in effect, two different cross-sectional configurations respectively conforming to those of two of the answer slots. More particularly, each of the question plates 26 and 28 has, in effect, one cross-sectional configuration when it is in the position shown in the drawings, and a different cross-sectional configuration when inverted, i.e., when rotated through an angle of 180° about a central axis perpendicular thereto.

More specifically, when each question plate 26 is in the position shown in the drawings, it will pass downwardly through the answer slot 42. When it is inverted, it will pass downwardly through the answer slot 44. Similarly, when each question plate 28 is in the position shown in the drawings, it will pass downwardly through the answer slot 43. When inverted, it will pass downwardly through the answer slot 45. Thus, only the two different types of question plates 26 and 28 are required for the four different answer slots 42, 43, 44 and 45, which is an important feature.

Each of the question plates 26 and 28 and the conforming one of the answer slots 42, 43, 44 and 45 are provided with mating grooves and lands permitting insertion of each question plate into the magazine 24 only through the answer slot conforming thereto. In the particular construction illustrated, the question plate 26 is provided on its rear side with vertical grooves 52 and 54 respectively receiving complementary vertical lands 56 and 58 in the answer slot 42 when the question plate 26 is inserted into the answer slot 42 with this question plate in the position shown in the drawings. When the question plate 26 is inverted from the position shown in the drawings, the grooves 52 and 54 therein respectively receive complementary lands 60 and 62 in the answer slot 44.

Similarly, the question plate 28 is provided in its rear side with vertical grooves 64 and 66 respectively receiving complementary lands 68 and 70 in the answer slot 43 when the question plate 28 is inserted into the answer slot 43 in the position of this question plate which is shown in the drawings. Upon inverting the question plate 28, the grooves 64 and 66 respectively receive complementary lands 72 and 74 in the answer slot 45.

Preferably, the various lands in the answer slots 42, 43, 44 and 45 begin slightly below the upper edges of the answer slots so that insertion of the question plates 26 and 28 may be initiated before the various lands begin to enter the corresponding grooves in the question plates. This facilitates insertion of the question plates 26 and 28 into the corresponding ones of the answer slots 42, 43, 44 and 45 with a minimum possibility of binding.

As previously indicated, the various grooves 52, 54, 64 and 66 in the question plates 26 and 28 are formed in the rear sides of the question plates. Thus, when the user attempts to insert one of the question plates 26 and 28 into one of the answer slots 42, 43, 44 and 45, the grooves in the question plates, and the lands in the answer slot into which insertion is attempted, are concealed from view. Thus, the user is not tempted to determine the correct answer to a question carried by the particular question plate in use by attempting to line up the grooves and lands.

Various multiple choice questions may be carried by the question plates 26 and 28. (It will be understood that if the device 20 is used for true or false questions, only two answer slots are required.) Preferably, the questions are printed on labels 76 adhered to the front sides of the question plates 26 and 28, the question plates being shown as having their front sides recessed slightly to receive the labels. This approach permits the question plates 26 and 28 to be used for any desired questions without changing the structures of the question plates, the desired questions being affixed to the front sides of the question plates by means of the labels 76. Also, recessing the labels 76 prevents wear thereof as the question plates 26 and 28 rub against each other in use.

In the particular construction illustrated, the multiple choice questions on the labels 76 are questions in multiplication. It will be noted that the exemplary label 76 shown in FIG. 1 of the drawings presents the question "6×?=12" when the corresponding question plate 26 is in the position shown. The correct answer, of course, is "2", which appears in front of and near the left end of the corresponding answer slot 42. Thus, if the particular question plate 26 shown above the answer slots in FIG. 1 is inserted into the answer slot 42, it will pass through this answer slot into the magazine 24, in front of the series of question plates in the magazine. If any attempt is made to insert this question plate 26 into any of the other answer slots, it will not pass herethrough, thereby indicating an incorrect answer. It will be noted that, when the question plate 26 of FIG. 1 is in the position shown, the question thereon appears at the left. The corresponding possible answers in front of the respective answer slots 42, 43, 44 and 45 correspondingly appear at the left also. In the particular construction illustrated, these possible answers are "2," "3," "4" and "5."

The possible answers "6," "7," "8" and "9" appear in front of the respective answer slots 42, 43, 44 and 45 adjacent the right ends thereof. When the particular question plate 26 shown above the answer slots in FIG. 1 of the drawings is inverted, a corresponding question "2×?=16" will appear adjacent the right end of this question plate. The correct answer, of course, is "8," which will be indicated to the user if he inserts the inverted question plate 26 into the "8" slot, i.e., into the slot 44. When this is done, the inverted question plate 26 will pass through the answer slot 44 and will be inserted between two question plates already in the magazine 24 to change, in random fashion, the sequence of question plates therein. Again, if any attempt is made to insert the inverted question plate 26 into one of the answer slots 42, 43 and 45, it will not pass therethrough, thereby indicating to the user that the answer he has selected is incorrect.

As previously indicated, the multiple choice multiplication questions shown on the exemplary label 76 on the question plate 26 above the answer slots in FIG. 1 of the drawings are illustrative only. Multiple choice questions of other types may be used with the question and answer device 20.

As previously explained, whenever one of the question plates 26 conforming to the answer slot 42 is inserted into the magazine 24 through that answer slot, it displaces the entire series of question plates 26 and 28 in the magazine rearwardly by the thickness of one question plate. Question plates 26 and 28 conforming to the answer slots 43, 44 and 45 randomly change the sequence of the question plates in the magazine 24. Ultimately, all of the question plates 26 and 28 in the magazine 24 will have been removed from the magazine one at a time and reinserted thereinto through the answer slots 42, 43, 44 and 45.

To advise the user when all of the question plates 26 and 28 have been used, the question and answer device 20 includes a dummy question plate 78 which, when it reaches the rear end of the magazine 24, will drop through a discharge passage 80 in the bottom of the magazine at the rear end thereof. The aforementioned rear overhang of the magazine 24 permits the dummy question plate 78 to drop through the discharge passage 80 onto the table, or other surface, on which the stand 22 supporting the question and answer device 20 is placed. As best shown in FIG. 7, the front side of the rear end 32 of the magazine 24 and the rear side of the dummy question plate 78 are provided with a complementary system of grooves and lands which permits the dummy question plate to drop through the discharge passage 80. However, the lands on the front side of the rear end 32 of the magazine 24 do not conform to the rear sides of any of the question plates 26 and 28, so that these question plates remain supported by the rear ends of the rails 34 on the bottom of the magazine.

When the dummy question plate 78 drops through the discharge passage 80 to signal that all of the question plates 26 and 28 have been used, the student may remove all of the question plates 26 and 28 from the magazine 24, invert them, and return them to the magazine, with the dummy question plate 78 at the front. After then running through all of the question plates 26 and 28 in their inverted positions, the user may remove the slot-forming members 46 and replace them on another magazine, not shown, containing another set of question plates 26 and 28 carrying different questions. This process can be repeated with a number of magazines.

As just explained, the question plates 26 and 28 of the question and answer device 20 must be rotated manually to obtain access to the alternative questions carried thereby. FIGS. 8 to 10 of the drawings show a question and answer device 120 of the invention having question plates 126 and 128 each of which is rotated automatically, through an angle of 90°, into a position to present a new question, such rotation occurring as the question plate is removed from a magazine 124 in which the question plates are stored.

The question and answer device 120 is similar to the device 20 in construction and operation. Consequently, only the significant differences will be discussed specifically.

The question plates 126 and 128 are of cruciform shape and are supported by rails 134 between which the lowermost arms of the question plates depend. The magazine 124 is provided adjacent its rear end 132 with an access opening 135 through which the rearmost question plate 126 or 128 may be removed. The rear end 132 of the magazine 124 is provided with a finger notch 136 which extends upwardly and laterally from a position opposite a central finger hole 138 in each question plate. At the top of the magazine 124, and forming one edge of the access opening 135, is a horizontal lip 140 which extends laterally of the magazine in the same direction as the lateral offset of the upper end of the finger notch 136.

In removing a question plate 126 or 128 from the magazine 124 through the access opening 135, the user inserts his index finger through the lower end of the notch 136 into the central hole 138 in the rearmost question plate. He then moves his finger upwardly along the notch 136 into and through the laterally offset upper portion thereof. As this occurs, one of the horizontal arms of the rearmost question plate engages the under side of the laterally extending lip 140, which rotates the question plate in the counterclockwise direction, as viewed in FIG. 9 of the drawings, as the user's index finger emerges from the upper end of the laterally offset portion of the notch 136. The top of the magazine 124 is provided, just forwardly of the access opening 135, with an upwardly extending wall 141 which is engageable by the tip of the user's finger, as it emerges from the upper end of the notch 136, to provide a backstop preventing the user from pushing the question plate being withdrawn out of a vertical position until it has been withdrawn far enough to be grasped by thumb and forefinger.

As will be apparent from the foregoing, the user's finger, the central hole 138 in the rearmost question plate 126 or 128, the laterally offset notch 136, the laterally projecting lip 140, one of the horizontal arms of the rearmost question plate, and the backstop 141, all cooperate to provide a means for automatically rotating the rearmost question plate through an angle of 90° as it is removedf rom the magazine 124 through the access opening 135. Such 90° rotation of the rearmost question plate 126 or 128 places this question plate in a position such that it presents a question different from that previously considered. Thus, after each question plate 126 or 128 has ben used four times, each of four questions carried thereby, in positions spaced 90° apart, will have ben presented to the user for answering, which is an important feature of the invention.

The question and answer device 120 further differs from the device 20 in that it is provided adjacent the front end 130 thereof with eight answer slots, instead of four, these answer slots being identified by the answer numerals "2," "3," "4," "5," "6," "7," "8" and "9" thereopposite. The "2" answer slot is located immediately adjacent the rear side of the front end 130 of the magazine 124 so that a question plate inserted therethrough moves the series of question plates 126 and 128 rearwardly one step. Any question plates 126 and 128 inserted into the magazine 124 through the remaining answer slots randomly change the sequence of the question plates in the magazine and randomly displace parts of the series of question plates rearwardly.

Each question plate 126 has four different cross-sectional configurations respectively conforming to those of four different ones of the answer slots, and each of the question plates 128 has four different cross-sectional configurations respectively conforming to those of the other four answer slots. More particularly, each question plate 126 will pass through the "2," "3," "4" and "5" answer slots when presented thereto in positions respectively angularly spaced apart by 90°. Similarly, each question plate 128 will pass through the "6," "7," "8" and "9" answer slots when presented thereto in positions respectively angularly spaced apart by 90°. As in the case of the question and answer device 20, the question plates 126 and 128 of the device 120 and the various answer slots thereof are provided with mating systems of grooves and lands which need not be described in detail herein.

The front side of each question plate 126 and 128 is provided with four angularly spaced labels 176, shown in dotted lines on the question plate 128 in FIG. 10, respectively presenting four different questions. The question which is upright for a particular angular position of the question plate is the one corresponding to the answer slot which will receive the question plate in that angular position thereof.

In all other respects, the structure and operation of the question and answer device 120 are similar to those of the answer device 20. Consequently, a further description is not necessary.

It will be apparent from the foregoing that the present invention provides a random-sequence question and answer device which is very versatile, but which is of very simple construction. The device requires no moving parts in the usual sense, the device being operated solely by removal and reinsertion of question elements one at a time, which is an important feature of the invention.

Although exemplary embodiments of the invention have been disclosed herein for purposes of illustration, it will be understood that the invention may be incorporated in various other embodiments without departing from the spirit thereof as defined by the claims appearing hereinafter.

I claim as my invention:

1. In a question and answer device, the combination of:
   (a) a longitudinally extending magazine;
   (b) a series of question elements loosely filling said magazine and slidable longitudinally thereof;
   (c) said magazine having adjacent one end thereof an access passage through which said question elements may be removed therefrom;
   (d) a series of answer passages extending laterally from and communicating with said magazine and aligned in the direction of the length of said magazine and spaced apart longitudinally thereof;
   (e) said answer passages respectively having different cross-sectional configurations;
   (f) each of said question elements having a cross-sectional configuration conforming to that of one of said answer passages;
   (g) whereby each of said question elements removed from said magazine may be reinserted into said magazine through a conforming one of said answer passages; and
   (h) said answer passages being located adjacent the other end of said magazine so that question elements reinserted into said magazine therethrough displace other question elements in said magazine longitudinally of said magazine toward said access passage.

2. A question and answer device according to claim 1 wherein at least one of said answer passages communicates with said magazine intermediate the ends thereof so that a question element reinserted into said magazine therethrough is inserted between other question elements in said magazine to change the order of said question elements.

3. A question and answer device as set forth in claim 2 wherein said access passage extends laterally from said magazine and wherein said answer passages are located above said magazine and communicate therewith at their lower ends.

4. A question and answer device according to claim 2 including a dummy question element in said magazine to mark the end of the series of question elements, said magazine being provided in the bottom thereof and adjacent said access passage with a discharge passage conforming in cross-sectional configuration to that of said dummy question element, whereby said dummy question element drops from said magazine through said discharge passage when the end of the series of question elements is reached.

5. A question and answer device according to claim 1 wherein said question elements comprise question plates and wherein each of said question plates and the conforming one of said answer passages are provided with mating grooves and lands permitting insertion of each question plate into the magazine through the answer passage conforming thereto.

6. A question and answer device as defined in claim 1 wherein each of said question elements has different cross-sectional configurations respectively conforming to those of different ones of said answer passages when inserted into said answer passages with orientations angularly spaced apart by a predetermined angle.

7. A question and answer device as set forth in claim 6 including cooperating means on said magazine and on said question elements for rotating each of said question elements through said predetermined angle as it is removed from said magazine through said access passage.

8. A question and answer device as defined in claim 6 wherein each of said question elements has two different cross-sectional configurations respectively conforming to those of two different ones of said answer passages when inserted into said answer passages with orientations angularly spaced apart by 180°.

9. A question and answer device as defined in claim 6 wherein each of said question elements has four different cross-sectional configurations respectively conforming to those of four different ones of said answer passages when inserted into said answer passages with orientations angularly spaced apart by 90°.

References Cited

UNITED STATES PATENTS

| | | | |
|---|---|---|---|
| 2,542,948 | 2/1951 | Scherf | 35—22.5 |
| 2,911,740 | 11/1959 | Miller | 35—22.5 |

WILLIAM H. GRIEB, Primary Examiner

U.S. Cl. X.R.

35—22.